United States Patent [19]

Sampei

[11] 3,759,530

[45] Sept. 18, 1973

[54] RECORD MECHANISM FOR CARTRIDGE TAPE PLAYER-RECORDER

[75] Inventor: Kazue Sampei, Fukushima-ken, Iwaki-shi, Japan

[73] Assignee: Alps Motorola, Inc., Tokyo, Japan

[22] Filed: Jan. 20, 1972

[21] Appl. No.: 219,457

[52] U.S. Cl. .......................... 274/4 B, 242/55.19 A

[51] Int. Cl. .......................................... G11b 27/24

[58] Field of Search .................... 274/4 R, 4 B, 4 C, 274/4 E, 4 D, 11 B, 11 C; 179/100.2 Z, 100.2 D; 242/55.19 A, 198

[56] References Cited

UNITED STATES PATENTS

| | | | |
|---|---|---|---|
| 3,485,500 | 12/1969 | Loeschner et al. | 274/4 B X |
| 3,677,556 | 7/1972 | Oosone | 274/4 C |

*Primary Examiner*—Harry N. Haroian
*Attorney*—Foorman L. Mueller et al.

[57] ABSTRACT

A locking mechanism for the selector used in determining the mode of operation of a cartridge type tape player-recorder comprising a cartridge locking arrangement having an arm member movable in response to the insertion of a cartridge into the player-recorder to secure the cartridge therein includes a rod coupled at one end to the arm member of the cartridge locking arrangement for movement therewith. The opposite end of the rod is positioned for engagement with a lever arm coupled to the selector to maintain the latter in a preselected position upon insertion of the cartridge into the player-recorder. The selector is freed upon return of the cartridge locking arrangement to its original position in response to the removal of the cartridge from the player-recorder.

9 Claims, 13 Drawing Figures

RECORD MECHANISM FOR CARTRIDGE TAPE PLAYER-RECORDER

BACKGROUND

This invention relates generally to cartridge type tape player-recorders and more particularly to mechanisms for locking the play-record mode selector control thereof in a preselected position.

Locking mechanisms for use in cartridge type tape player-recorders for releasably securing the mode selector control in a preselected position are desirable to insure that information which is recorded or is to be recorded on a tape cartridge is not lost during the operation of the tape player-recorder in the "play" or "record" modes, respectively, due to the accidental repositioning of the mode selector.

SUMMARY

Accordingly, it is a primary object of the present invention to provide a new and improved locking mechanism for the mode selector control in a cartridge type tape player-recorder operated in response to the insertion of a cartridge into the cartridge receiving cavity thereof to secure the selector control in a preselected position.

It is another object of the invention to provide a mode selector locking mechanism of the above described type which is operated in conjunction with the operation of apparatus for securing a tape cartridge in the tape player-recorder.

It is still another object of the present invention to provide a new and improved mode selector locking mechanism as described which is efficient in operation and relatively simple to produce.

Briefly, a preferred embodiment of the locking mechanism for the mode control selector of a cartridge type tape player-recorder, comprises a movable rod mounted at one end on the cartridge locking mechanism of the player-recorder. Operation of the cartridge locking mechanism to secure a cartridge in the player-recorder in response to the insertion of the cartridge thereinto in turn moves the opposite end of the rod into engagement with the lever arm of a manually operated selector used for selecting the mode of operation of the player-recorder.

The selector is moved to a predetermined position, i.e. play or record position, prior to the insertion of a cartridge into the player-recorder. A cartridge inserted into the player-recorder engages the cartridge locking mechanism to lock the cartridge into place, and in turn, through the mode selector locking mechanism, to lock the mode selector lever arm into the preselected position. Withdrawal of the cartridge from the player-recorder returns the cartridge locking mechanism and the mode selector locking mechanism to their original positions.

DESCRIPTION OF THE DRAWINGS

In the drawings:

FIG. 3*a* is a top plan view of the cartridge tape player-recorder of FIG. 1*a* as illustrated subsequent to the insertion of a cartridge thereinto with the mode selector control lever in the record mode;

FIG. 3*b* is a side view of the mode selector control lever of the tape player-recorder of FIG. 3*a*;

FIG. 3*c* is a rear view of the mode selector control lever of the tape player-recorder of FIG. 3*a*;

FIG. 4*a* is a top plan view of the cartridge tape player-recorder of FIG. 1*a* illustrating the state wherein the mode selector control lever is not completely pushed to the record position when the cartridge is inserted into the player-recorder;

FIG. 4*b* is a side view of the mode selector control lever of the tape player-recorder of FIG. 4*a*;

FIG. 4*c* is a rear view of the mode selector control lever of the tape player-recorder of FIG. 4a; and FIG. 5 is a perspective view of an alternative embodiment of a mode selector control lever according to the invention.

DETAILED DESCRIPTION

Figures 1A, 1B, 1C, 2A, 2B, 2C:
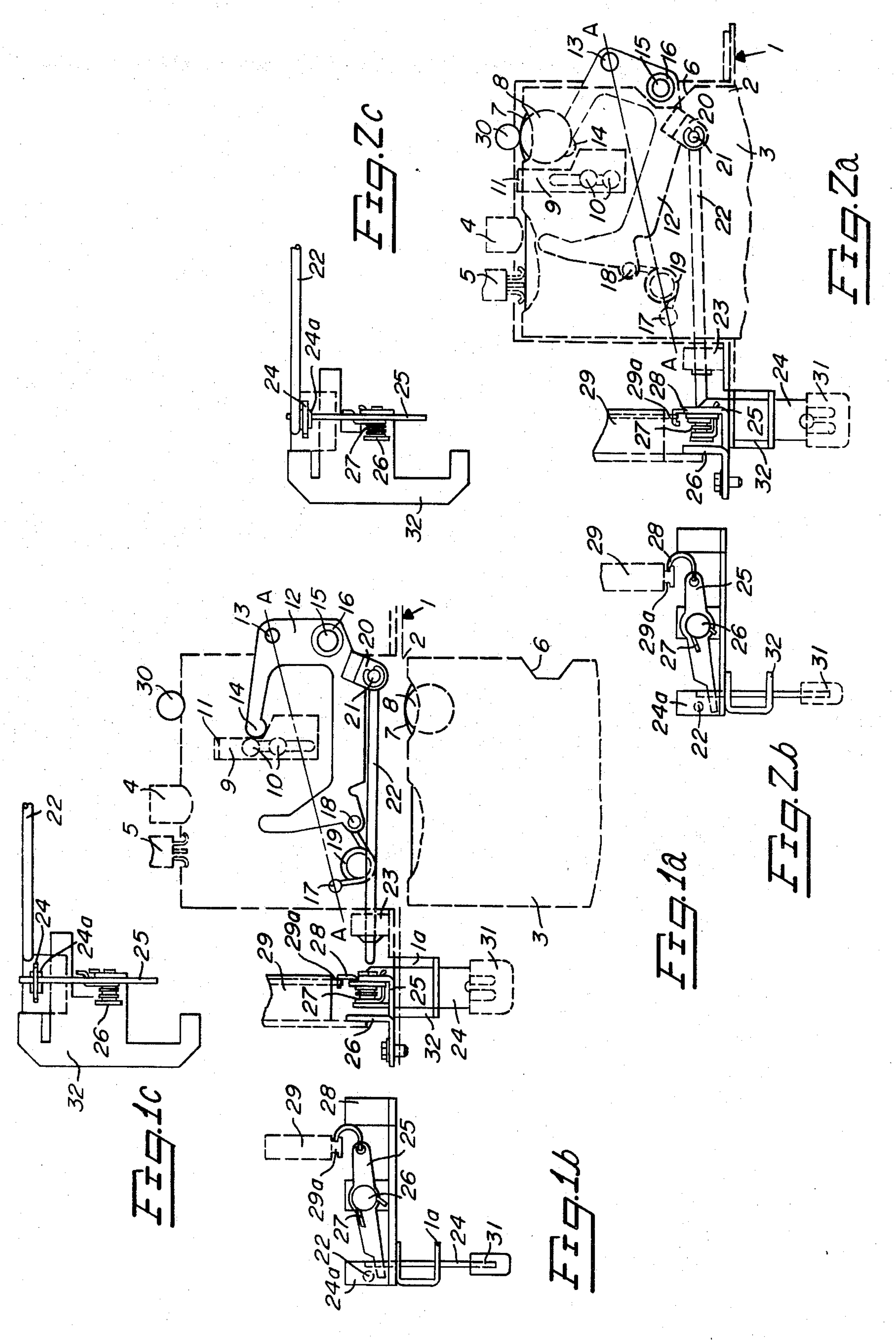
FIG. 1*a* is a top plan view of a cartridge type tape player-recorder incorporating a mode selector locking mechanism according to the invention, as illustrated prior to the insertion of a cartridge therein.
FIG. 1*b* is a side view of the mode selector control lever of the tape player-recorder of FIG. 1*a*.
FIG. 1*c* is a rear view of the mode selector control lever of the tape player-recorder of FIG. 1*a*.
FIG. 2*a* is a top plan view of the cartridge tape player-recorder of FIG. 1*a* as illustrated subsequent to the insertion of a cartridge thereinto with the mode selector control lever in the play mode.
FIG. 2*b* is a side view of the mode selector control lever of the tape player-recorder of FIG. 2*a*.
FIG. 2*c* is a rear view of the mode selector control lever of the tape player-recorder of FIG. 2*a*.

Referring now to the drawings wherein like numerals have been employed throughout the various views to designate similar parts, numeral 1 designates the main body of a tape player-recorder incorporating a locking mechanism for a record control selector according to the invention. A cavity 2 formed in the tape player-recorder body 1 is provided to receive a tape cartridge 3 therein. A magnetic tape head 4 and contact switch 5 are provided at the innermost end of the cavity. The cartridge 3 includes a recess formed along a side surface thereof and a pressure roller 7 and recording tape 8 are also provided within the cartridge.

A slide member 9 is mounted for sliding, forward and rearward movement on supports 10 extending from body 1. A bent portion 11 of slide member 9 is provided at one end thereof for engagement with a cartridge 3 inserted into cavity 2 to slide the slide member inwardly of the player-recorder. Numeral 12 designates a C-shaped lever arm of a cartridge locking mechanism included in the player-recorder. The C-lever is rotatably mounted on body 1 by support 13. One end 14 of the C-lever is disposed at a position adjacent the slide member 9. C-lever 12 also includes a roller 16 mounted thereon by support 15 for engaging the side surface of cartridge 3 and being received in recess 6 upon rotation of C-lever 12 by engagement thereof at end 14 by slide member 9. The slide member is moved into engagement with end 14 by the insertion of a cartridge 3 into cavity 2. Numerals 17 and 18 show pins fixed on the body 1 and C-lever 12, respectively, to which the ends of a snap-over or overcenter spring 19 are attached. The snap-over spring 19 moves the C-lever 12 to two stable positions upon the insertion and withdrawal of a cartridge into and out of cavity 2, respectively.

A mode control selector locking mechanism incorporated in the tape player-recorder includes a bracket arm 20 fixed on C-lever 12. A lever arm or rod 22 is attached to the bracket arm at one end by support 21 and cooperates with the C-lever for reciprocating motion thereon. The opposite end of lever arm 22 is mounted for sliding movement in a guide 23 fixed on body 1. The mode selector of the player-recorder includes a push lever 24 loosely fitted in a sliding guide member 32 of body 1. A swing lever 25 is mounted for rotation on a support 26 provided on body 1. One end of the swing lever 25 passes through an aperture 24a in push lever 24 and is held therein. A spring 27 mounted at support 26 biases the swing lever 25 against push lever 24 to keep the latter lever extending normally outwardly of the tape player-recorder. Numeral 28 designates a spring arm extending between swing lever 25 and an actuating rod 29a.

A capstan shaft 30 provided on body 1 is driven to move tape 7 through a cartridge when the tape and pressure roller 8 in the cartridge engage the shaft 30.

A knob 31 mounted on push lever 24 is depressed to operate the tape player-recorder to the record mode. A slide guide 32 is provided through which push lever 24 travels and serves also as a stop to engage knob 31, thereby permitting it to be pushed inwardly only a predetermined distance.

The operation of the mode control selector locking mechanism according to the invention is as follows. Prior to the insertion of cartridge 3 into cavity 2, the tape player-recorder is as shown in FIG. 1*a*. Upon insertion of the cartridge 3 into cavity 2 the front surface of the former engages piece 11 of the slide member 9 to move the latter member therewith. One end 14 of the C-lever 12 is engaged by the moving slide member 9 to rotate the C-lever about point 13 in a clockwise direction as seen in the drawings.

Movement of the end of snap-over spring 19 coupled at pin 18 to the C-lever across the snap-over line shown by imaginary line A—A, causes C-lever 12 to be moved rapidly from a first stable state to a second stable state. Roller 16 mounted on the C-lever is thereby pressed into recess 6 formed in cartridge 3, and at the same time the lever arm 22 mounted on bracket 20 fixed on the C-lever 12 is moved through guide member 23 in the direction of the arrow of FIG. 1a. At this time, the pressure roller 8 presses tape 7 against the rotating capstan shaft 30 and the tape likewise is pressed against the magnetic tape head 4. The rotation of shaft 30 moves tape 7 through the cartridge past tape head 4 to begin the operation of the tape player-recorder in the play or reproduction mode (See FIGS. 2*a*, 2*b*, 2*c*).

If it is attempted to press the record knob 31 inwardly to the record position while in the play mode of FIG. 2*a*, the swing lever 25 is stopped by the lever arm 22 which has moved into the path of the swing arm 25. Thus, actuation of the recording switch 29 is prevented. It is therefore not possible to move the tape player-recorder into the record condition during the reproduction or play mode of operation.

To place the tape player-recorder in the record mode, the push lever 24 must be pressed inwardly prior to the insertion of cartridge 3 into the cavity 2. The knob 31 attached to lever 24 is moved until it is engaged and stopped by the guide member 32. When the cartridge 3 is now inserted into cavity 2, the lever arm or rod 22 slides in the direction of the arrow of FIG. 1*a* and engages swing lever 25 on the side thereof opposite that engaged in the reproduction mode, to prevent the swing lever 25 from returning to its original or normal position even after the release of knob 31. The swing lever operates recording switch 29 (FIG. 3*b*) to place the tape player-recorder instrumentalities in the record mode.

The distance of travel of the recording knob 31 to sliding guide member 32 is greater than the transfer of lever 29a of the recording switch 29 to an operated condition. The difference is absorbed by spring arm 28. The latter is provided to prevent failure of operation of the switch 29 due to differences in mounting of the latter with respect to swing lever 25.

Figures 3A, 3B, 3C, 4A, 4B, 4C, 5:
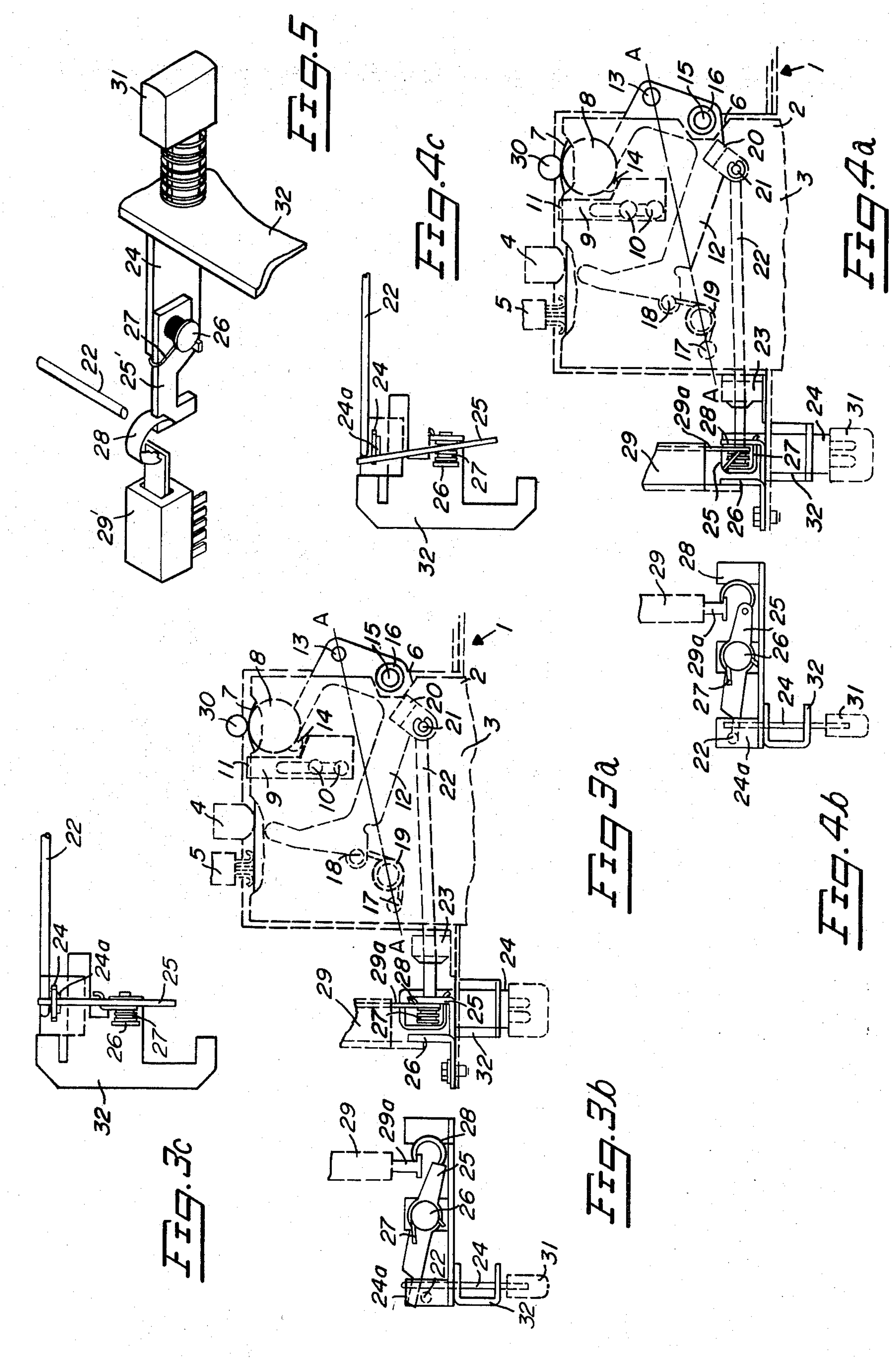

If upon attempting to place the tape player-recorder in the record mechanism the push lever 24 is not fully depressed to engage guide member 32, the end of lever arm 22 may engage the side surface of push lever 24 upon inserting cartridge 3 into the cavity 2. If the latter should occur, the spring 27 used to mount lever 25 to support 26 will take up the force of lever arm 22 as shown in FIG. 4c, causing the swing lever 25 to become inclined with respect to the support 26. Pressing push lever 24 further so that knob 31 engages guide member 32 causes the swing lever 25 to be transferred into the recording condition of FIG. 3 even though it is being engaged by the lever arm 22. Upon release of the push lever 24, however, the swing lever 25 is returned to its play (non-record) condition as shown in FIG. 1.

The mode selector locking mechanism incorporated into the cartridge tape player according to the invention may be used with a second embodiment of a swing lever such as 25′ shown in FIG. 5 of the drawings. As will be seen, the swing lever 25′ does not pivot as in the case of the swing lever 25 but is moved inwardly by the depression of knob 31. A cavity cut in swing lever 25′ receives the lever arm 22 upon insertion of a cartridge 3 into the cavity 2 to maintain the swing lever 25′ in the record condition. Likewise, the switch 29 operates in a reverse mode from that of the embodiments shown in FIGS. 1–4.

The present invention as is clear from the above description of the operation of the record mode locking mechanism maintains the record mode control in a preset condition so that there exists little chance of placing the player-recorder into a record mode when it is desired to play back information on a tape cartridge or, in other words, eliminates the possibility of erasing previously recorded information on a cartridge inserted into the unit. In addition, the mechanism according to the invention prevents failure due to the mistake of an operator of the player-recorder and prevents loss of information to be recorded on a cartridge inserted into the tape player-recorder. The record control locking mechanism according to the invention is, as described, interconnected with an existing cartridge locking mechanism for simple construction and ease of assembly, and thus is relatively inexpensive to fabricate.

I claim:

1. In a cartridge type tape player-recorder including a tape cartridge receiving cavity, instrumentalities for playing pre-recorded tape cartridges and for recording unrecorded tape cartridges received in said cavity in accordance with the selection of the mode of operation of said instrumentalities, cartridge locking means including a first member mounted for engagement with a cartridge inserted into said cavity and a second member coupled to said first member and movable therewith from a first to a second position into engagement with the cartridge in response to the insertion of the cartridge into said cavity, to secure said cartridge in said cavity, and movable from said second to said first position in response to the withdrawal of said cartridge from said cavity, to release said cartridge and a selector for selecting the mode of operation of said instrumentalities including means movable from a play position to a record position, means for locking said selector into a pre-selected position corresponding to one of said modes of operation, said locking means comprising: a member connected at one end to said cartridge locking means with the other end thereof positioned for engagement with said selector means whereby upon insertion of a cartridge into said cartridge receiving cavity, said member is moved in response to the movement of said cartridge locking means from said first to said second position, into engagement with said selector means to secure said selector in a pre-selected position.

2. A cartridge type tape player-recorder as claimed in claim 1 wherein said selector means includes a pivotally mounted arm movable from a first, play position to a second, record position, wherein said one end of said member of locking means is connected to said second member of said cartridge locking means and wherein upon movement of said second member of said cartridge locking means from said first to said second position, the other end of said member engages said pivotal arm on one side or the other depending upon the positioning thereof, to maintain said pivotal arm in a preselected position.

3. A cartridge type tape player-recorder as claimed in claim 2 wherein the selector includes resilient biasing means for biasing said pivotal arm of said selector means to said first position and wherein said selector means further includes a manual control member actuable to move said pivotal arm against said biasing means from said first to said second position and upon release, permitting said pivotal arm to return to said first position.

4. A cartridge type tape player-recorder including a tape cartridge receiving cavity, instrumentalities for playing pre-recorded tape cartridges and for recording unrecorded tape cartridges received in said cavity in accordance with the mode of operation of said instrumentalities, cartridge locking means for releasably securing a cartridge in said cavity including a member movable from a first to a second position upon insertion of a cartridge into said cavity and from said second to said first position upon withdrawal of said cartridge from said cavity, a selector for selecting the mode of operation of said tape playing and recording instrumentalities including means movable from a play to a record position, and means for locking said selector into one of said positions, said locking means including a member coupled to said cartridge locking member and movable therewith in response to the insertion of a cartridge into said cavity for engagement with said selector means to maintain said last-mentioned means in a preselected position corresponding to one of said modes of operation.

5. A cartridge type tape player-recorder as claimed in claim 4 wherein said mode selector includes a manually operated switch including a switch arm movable between first and second positions, movement of the switch arm from said first to said second position operating said instrumentalities to the record mode and movement of the switch arm from said second to said first position operating said instrumentalities to said play mode, and wherein said locking means member is connected at one end to said cartridge locking means member and the other end is positioned for engagement with said switch arm, whereby upon movement of said cartridge locking means member from said first to said second position, said locking means member is moved into engagement with said switch arm in a first or second relation therewith depending upon the positioning of said switch arm, to maintain the latter in said selected position.

6. A cartridge type tape player-recorder as claimed in claim 5 wherein said mode selector switch arm is mounted for pivotal movement at one end thereof and is spring biased to said first position, wherein said mode selector includes a pushbutton engaging said switch arm at the free end thereof so that depression of said pushbutton moves said arm from said first to said second position and release of said pushbutton permits said switch arm to return to said first position and wherein said selector locking means member is engageable with said switch arm on a first side thereof to prevent movement of said switch arm from said first to said second position when said pushbutton is in the released position and engageable with said switch arm on a second side thereof to prevent movement of said switch arm from said second to said first position when said pushbutton is in the depressed position.

7. A cartridge type tape player-recorder comprising, in combination: tape playing and recording instrumentalities for playing pre-recorded and recording unrecorded tape cartridges received in said player-recorder, respectively, cartridge locking means movable from a first to a second position in response to the insertion of a cartridge into said player-recorder for releasably securing said cartridge in said player-recorder and movable from said second to said first position upon removal of said cartridge therefrom, a selector for selecting the mode of operation of said tape playing and recording instrumentalities, including means movable between a first position corresponding to a play condition and a second position corresponding to a record condition, and a locking arrangement for locking said selector means into a selected one of said positions in response to the insertion of a cartridge into said player-recorder, said arrangement including means coupled to said cartridge locking means and movable therewith, said means positioned for engagement with said selector means and movable into engagement therewith in response to the movement of said cartridge locking means from said first to said second position, thereby to releasably lock said selector in a pre-selected position.

8. A cartridge type tape player-recorder as claimed in claim 7 wherein said cartridge locking means includes an arm member mounted for pivotal movement between said first and second positions, wherein said selector includes a lever arm mounted for pivotal movement between a first play position and a second record position and biasing means for resiliently biasing said lever arm to said first position and wherein said selector locking means includes a rod member mounted at one end to the arm member of said cartridge locking means and the opposite end thereof positioned for engagement with said lever arm, whereby upon pivoting said cartridge locking means arm member from said first to said second position, said rod member is moved into engagement with said lever arm to maintain said last-mentioned arm in a pre-selected position.

9. A cartridge type tape player-recorder as claimed in claim 8 wherein said selector further includes a pushbutton mechanism coupled to said lever arm, whereby depression of said pushbutton moves said lever arm from said first to said second position and release of said pushbutton permits said lever arm to return to said first position, and wherein said rod member is engageable with said lever arm on a first side thereof to maintain said selector in a record position when said pushbutton is depressed and is engageable with said lever arm on a second side thereof to maintain said selector in a play position when said pushbutton is released.

* * * * *